Patented Aug. 27, 1946

UNITED STATES PATENT OFFICE 2,406,692

SOLID COMPLEX METAL AMMINE SALTS AND METHOD FOR THE PREPARATION THEREOF

Grinnell Jones and Walter Juda, Cambridge, Mass., assignors to Albi Chemical Corporation, New York, N. Y., a corporation of New York No Drawing. Application June 17, 1942, Serial No. 447,470

5 Claims. (Cl. 167—16)

The present invention relates to a solid complex metal ammine salt and to methods for the preparation thereof.

By the term "ammine" it is intended to include only ammonia and amines.

Complex metal ammine salts vary widely in chemical structure and also in physical properties, particularly with regard to stability and solubility, depending upon the nature of the metal (and in some cases its state of oxidation), the anion, the conditions of preparation and other factors. For these and other reasons, it is difficult to generalize in this field and to determine in advance either the nature of the final product or the essential or optimum ingredients or procedures to be employed.

Many complex metal ammine salts are extremely soluble in water and for this reason it is difficult to prepare them in the solid state, in view of the difficulty of precipitating them from the solutions in which they are formed. Attempts to prepare these soluble salts in the solid state by chilling the solutions are often ineffective and give poor yields. Attempts to recover the salt by evaporation of the liquid commonly result in loss of ammonia or of a volatile amine by volatilization. Other complex metal ammine salts which are sparingly soluble are not subject to these difficulties but involve other difficulties in precipitation, filtering, washing and drying.

It is an object of our invention to provide an improved product comprising a solid complex metal ammine salt and an improved method for the manufacture thereof.

Our products are, for the most part, soluble in water or in dilute aqueous ammonia solutions, but, upon evaporation of the solution and volatilization of the ammonia or volatile amine, insoluble metal salts are deposited.

In general, our improved method comprises the dry mixing and agitation of a solid metal compound (which may for purposes of identification be referred to as the primary metal compound or salt) which is soluble in water, with a source of ammine, preferably a solid ammine compound which is relatively unstable and which will form, with the primary metal compound, a complex metal ammine salt, and also with a second salt or salts, soluble in water and containing an anion which is capable of forming an insoluble salt with the primary metal compound.

When a source of ammonia such as ammonium carbonate, ammonium carbamate, or the like, is used, carbon dioxide is liberated during the mixing and agitation. In some cases color changes characteristic of the metal appear. The mixture becomes wet and in some cases pasty, almost fluid. The solid complex metal compound may be dried after the reaction is complete, or the agitation and drying may be accomplished simultaneously. The product may be ground to any desired particle size.

In some cases it is desirable to heat the mixture to start the reaction. The heat is preferably moderate, of the order of 70–80° C., although considerable variation in this temperature is permissible according to the ingredients and the final product involved.

Drying can be accelerated by the application of a vacuum.

For a better understanding of our invention, the following specific examples of its application may be given, it being understood that these are illustrative only and are not to be construed in a limiting sense. The proportions are by weight.

*Example 1.*—45 parts of copper sulfate, 50 parts of ammonium carbonate and 16 parts of sodium fluoride are mixed in dry form in a mortar and the mixture is agitated, as by stirring. The reaction starts almost immediately and proceeds with the liberation of carbon dioxide and water. After the reaction has gone to completion (as indicated by the fact that carbon dioxide is no longer given off), the product may, if desired, be dried by spreading it in thin layers. It may then be ground if desired.

The mixing and drying may be simultaneously accomplished. For instance, the reaction may be carried out in a closed vessel to which a vacuum is applied during the reaction, the vessel being heated in a water bath or otherwise. Evolution of carbon dioxide and water vapor will reduce the vacuum during the progress of the reaction and completion of the reaction and formation of the desired dry product will be indicated by decrease in and stabilization of the pressure.

For example, in one experiment it was found that when 1 lb. of the product was formed in a five litre, three-neck Pyrex flask, under a vacuum which finally went to about 22 millimeters of mercury, the flask being heated in a water bath to approximately 100° C., the reaction was complete in less than one hour.

The exact nature of the final produce is subject to some speculation.

It is possible that the sodium fluoride appears as such in the final product, mixed with copper ammonia sulfate. Or there may be a double decomposition reaction which results in the formation of copper ammonia fluoride and also the formation of sodium sulfate simultaneously with the formation of the complex copper ammonia salt. A third possibility is that both of these reactions may take place to some extent; the final product may be intermediate between the two first indicated, comprising a mixture of copper ammonia sulfate, copper ammonia fluoride, sodium sulfate and sodium fluoride.

In most cases it is immaterial which of these conditions prevails, since in any event the final product will contain ions which, when dissolved, deposited upon a base material such as a fabric and the ammonia volatilized, will leave an insoluble metal compound.

If we assume the final product to be a mixture of copper ammonia sulfate and sodium fluoride, the theoretical amounts of copper, ammonia and fluorine present will be: Cu, 19%, $NH_3$, 20.3% and F, 12%, based on the original amounts of copper sulfate, ammonium carbonate and sodium fluoride given in Example 1. If complete double decomposition takes place and the final product consists of copper ammonia fluoride and sodium sulfate, the relative amounts of copper, ammonia and fluoride in the product still would not be significantly changed from the percentages just given.

If the number of molecules of water of crystallization per molecule of copper ammonia fluoride should be high, the above theoretical percentages of copper, ammonia and fluorine would no longer hold. This, however, seems unlikely, since water is obviously liberated during the reaction.

Analysis of our product prepared in accordance with Example 1 has given figures closely comparable to the theoretical percentages just given.

The complex final product is quite stable. Only one-fifth of the ammonia is lost when the powder is dried for thirty minutes at a temperature of 106° C. If the product is to be used in solution, the loss of ammonia during drying (if any) does not render the product useless, since a small addition of ammonia to the solution will dissolve any residue.

The final composition which contains the theoretical proportions within the limits given above is soluble in water, giving a deep blue solution characteristic of copper ammonia complex compounds. If an excess of water is added, the solution turns to a lighter blue and a turbidity appears which may be due to hydrolysis. A small addition of ammonia, however, clears the solution again and causes the deep blue color to reappear. This indicates that an excess of ammonia is required to obtain stable dilute solutions of copper ammonia compounds.

Since the copper ammonia compound is a fairly stable compound, the product can be dried by heat. A short exposure to a temperature of about 105° C. will dry the product if it is exposed to the heat in thin layers, without decomposing the copper ammonia complex. A continued exposure, however, will slowly decompose the complex, ammonia being given off and the deep blue to violet color of the powder becoming lighter.

Additional examples of operative ingredients and proportions of ingredients are given below. The mixing and agitation may be carried out as in Example 1.

Example 2

| | Parts |
|---|---|
| Copper sulfate | 45 |
| Ammonium carbonate | 60 |
| Monoammonium phosphate | 20 |

Example 3

| | Parts |
|---|---|
| Zinc chloride | 25 |
| Ammonium carbonate | 50 |
| Monoammonium phosphate | 20 |

Example 4

| | Parts |
|---|---|
| Silver nitrate | 50 |
| Ammonium carbonate | 40 |
| Disodium hydrogen arsenate ($Na_2HAsO_4.7H_2O$) | 35 |

When preparing unstable complex metal ammonia salts as in Examples 3 and 4, it may be necessary to take precautions to prevent decomposition of the complex salt during and after its formation.

*Example 5.*—45 parts of copper sulfate and 16 parts of sodium fluoride are mixed together and, while being agitated, ammonia gas in amount of the order of 12–15 parts is passed through the mass.

If a vacuum is applied to the mixture of Example 5, it should not be applied until the ammonia gas has reacted with the salts, since otherwise the ammonia gas might be drawn off without reacting.

While ammonia gas will react with soluble metal salts such as copper sulfate, to form complex copper ammonia salts, it will not so react with insoluble salts such as copper fluoride, copper phosphate and copper arsenite.

Both the specific ingredients and the relative amounts thereof given in the foregoing examples are subject to wide variation.

As primary metal salts, salts of cobalt, nickel, silver, zinc, cadmium and others capable of forming complex ammine salts, or mixtures of such metal salts, may be used. One or more of such compounds may be used.

In the appended claims we use the term "ammine complexogen metal" to designate metals which are capable of forming complex metal amine salts or metal ammonia salts, when mixed in the solid state with a solid source of ammine.

In place of ammonium carbonate there may be used ammonium bicarbonate, ammonium carbamate, urea, amine compounds, such as carbonates, for example guanidine carbonate, and the like. Ammonia gas may be used with copper sulfate and like soluble salts.

For the secondary metal salt there may be used essentially neutral, water soluble salts, the anion of which will form, with the metal of the primary compound or salt, a compound which is relatively insoluble in water. One or more of such salts may be used.

It is to be noted that salts which are strongly basic or acid are not suitable for admixture with the primary metal salt and the source of ammine prior to reaction between these ingredients to form the complex metal ammine salt, because the strong alkalinity or acidity imparted thereby would prevent the formation of the complex salt. The ammonia will be driven off from strongly basic mixtures and the complex formation cannot take place in strongly acid media. The compound selected as a secondary salt should, therefore, be one which is substantially neutral.

As previously indicated, the proportions of ingredients usable in our process are subject to considerable variation. If it is desired to effect complex conversion of the metal salt to the complex metal ammine compound, sufficient ammine must obviously be supplied for this purpose.

Our product comprises a solid water-soluble complex metal ammine salt, in combination with another soluble salt, said combination being either chemical or mechanical. This product is adapted to a variety of uses. For instance, it may be dissolved in water and applied to a fabric, Upon drying and volatilizing the ammonia or volatile amine, there will be deposited upon the fabric a relatively insoluble metal salt which may have desirable preservative and/or other properties.

Products of varying degrees of stability may be prepared by our process. Thus the product of Example 1 is quite stable. Products of highly unstable character can also be prepared by our method, as in Examples 3 and 4. These products may contain so low an ammonia content as to necessitate their solution in dilute aqueous ammonia rather than in water. However, even in these cases a small amount of ammonia added to a turbid aqueous solution of the unstable product will clear the solution immediately instead of causing first a temporary precipitate of metal hydroxide (soluble only in an excess of ammonia) which is obtained in the case of aqueous solutions of non-complex salts of ammine complexogen metals.

The stability of the metal ammonia complex salt depends upon the metal of the primary salt and upon the anion of the essentially neutral secondary salt. Thus the product of Example 3 is relatively unstable because it contains the unstable zinc ammonia complex ion which gives salts having a comparatively high vapor pressure of ammonia, and the product of Example 4 is unstable because there is a strong tendency to form the highly insoluble silver arsenate (solubility: 0.00085 g. in 100 cc. water at 20° C.). Obviously, the more unstable the product, the more difficult it is to give exact figures of its ammonia content. Thus the products of Examples 3 and 4 may contain varying amounts of ammonia according to the precautions taken in their preparation, and they may therefore be more or less soluble in water.

It will thus be seen that by our invention there is provided a novel and improved product having a wide field of utility and also a novel process for the formation of products comprising complex metal ammine salts.

We claim:

1. The process of forming solid compositions containing a complex metal salt, which process comprises mixing and agitating together a water-soluble solid complexogen metal salt, a non-aqueous source of ammine, and a second solid, water-soluble and substantially neutral salt which contains an anion capable of forming a water-insoluble compound with the metal of the said first salt, and continuing said agitation until the formation of a complex metal salt is substantially complete.

2. The process for forming solid compositions containing a complex metal salt, which process comprises mixing together a water-soluble salt of a metal selected from the group consisting of copper, cobalt, nickel, silver, zinc, and cadmium, a second solid substantially neutral salt which is soluble in water and which contains an anion capable of forming an insoluble compound with the metal of the said first salt, and a substance selected from the group consisting of ammonium carbonate, ammonium bicarbonate, ammonium carbamate and non-aqueous ammonia, and agitating said mixture until the formation of a complex metal salt is substantially complete.

3. The method which comprises reacting in a finely divided state a solid complexogen metal salt which is soluble in water, a second solid water-soluble salt which is substantially neutral and which contains an anion capable of forming a water-insoluble salt with the metal of the said first solid salt, and passing ammonia gas through said mixture while agitating the same.

4. The method which comprises reacting in a finely divided state a primary solid complexogen metal salt which is soluble in water, a non-aqueous source of ammonia and a second solid salt which is soluble in water and substantially neutral and which contains an anion capable of forming a water-insoluble salt with the metal of the primary salt, thereby forming a composition containing a solid water-soluble complex metal ammonia salt, dissolving the composition in water, applying the dissolved salts to a fabric and then treating the fabric to volatilize the ammonia, whereby a water-insoluble metal compound is deposited on the fabric.

5. A solid composition of matter comprising the complex copper ammonia ion, an anion which will form a sparingly soluble salt with the copper of said complex ion upon decomposition of the complex, and ions which will combine to form a water-soluble secondary salt, said composition containing copper and ammonia in approximately equal quantities.

GRINNELL JONES.
WALTER JUDA.

Certificate of Correction

Patent No. 2,406,692.　　　　　　　　　　　　　　August 27, 1946.

GRINNELL JONES ET AL.

It is hereby certified that errors appear in the printed specification of the above numbered patent requiring correction as follows: Column 1, line 6, for "very" read *vary*; column 2, line 46, for "produce" read *product*; column 4, line 67, for "complex" read *complete* ; and that the said Letters Patent should be read with these corrections therein that the same may conform to the record of the case in the Patent Office.

Signed and sealed this 22nd day of October, A. D. 1946.

[SEAL]

LESLIE FRAZER,
*First Assistant Commissioner of Patents.*